(12) United States Patent
Kovacevic et al.

(10) Patent No.: US 10,418,901 B2
(45) Date of Patent: Sep. 17, 2019

(54) POWER CONVERTER AND METHODS OF CONTROLLING A POWER CONVERTER

(71) Applicant: Danmarks Tekniske Universitet, Kgs. Lyngby (DK)

(72) Inventors: Milovan Kovacevic, Kgs. Lyngby (DK); Mickey P. Madsen, Kgs. Lyngby (DK)

(73) Assignee: Danmarks Tekniske Universitet, Kgs. Lyngby (DK)

( * ) Notice: Subject to any disclaimer, the term of this patent is extended or adjusted under 35 U.S.C. 154(b) by 0 days.

(21) Appl. No.: 15/109,398

(22) PCT Filed: Feb. 26, 2015

(86) PCT No.: PCT/EP2015/053980
§ 371 (c)(1),
(2) Date: Jun. 30, 2016

(87) PCT Pub. No.: WO2015/128398
PCT Pub. Date: Sep. 3, 2015

(65) Prior Publication Data
US 2016/0359412 A1 Dec. 8, 2016

(30) Foreign Application Priority Data
Feb. 27, 2014 (EP) .................................. 14156917

(51) Int. Cl.
*H02M 3/158* (2006.01)
*H02M 3/155* (2006.01)
(Continued)

(52) U.S. Cl.
CPC ............ *H02M 3/158* (2013.01); *H02M 1/08* (2013.01); *H02M 1/14* (2013.01); *H02M 3/155* (2013.01);
(Continued)

(58) Field of Classification Search
CPC ........ H02M 3/155; H02M 3/158; H02M 1/08; H02M 1/14; H02M 2001/0009;
(Continued)

(56) References Cited

U.S. PATENT DOCUMENTS 7,327,127 B2 2/2008 Ho
8,441,245 B2 5/2013 Ferguson
(Continued)

FOREIGN PATENT DOCUMENTS

JP 2001-37215 A 2/2001
JP 2001037215 2/2001
(Continued)

OTHER PUBLICATIONS

AN-1319, Application Report SNVA085B, "Analysis and Design of a Hysteretic Constant Frequency Buck Regulator Using the LM5007," Texas Instruments, Apr. 2013.*
(Continued)

*Primary Examiner* — Adolf D Berhane
*Assistant Examiner* — Jye-June Lee
(74) *Attorney, Agent, or Firm* — Knobbe Martens Olson & Bear, LLP

(57) ABSTRACT

The present invention relates to a new method of power converter regulation, in particular regulation of very high frequency (VHF) power converters operating at frequencies in the MHz range, wherein accurate output regulation utilizes inherent delays in the regulation loop, whereby, contrary to hysteresis on/off control, the new method does not require immediate responses to comparisons of a sense voltage to two reference voltages; rather, according to the new method, only one reference voltage is used, and delays in the feedback loop are allowed to cause some variation of an output of the power converter.

19 Claims, 22 Drawing Sheets

(51) Int. Cl.
*H02M 1/08* (2006.01)
*H02M 1/14* (2006.01)
*H02M 1/00* (2006.01)

(52) U.S. Cl.
CPC ............. *H02M 2001/0009* (2013.01); *H02M 2001/0019* (2013.01); *H02M 2001/0035* (2013.01); *H02M 2003/1557* (2013.01); *Y02B 70/16* (2013.01)

(58) Field of Classification Search
CPC ............. H02M 2001/0019; H02M 2001/0035; H02M 2003/1557; Y02B 70/16
See application file for complete search history.

(56) References Cited

U.S. PATENT DOCUMENTS

| | | | |
|---|---|---|---|
| 8,493,754 B1* | 7/2013 | Wambsganss ...... | H02M 1/4216 323/284 |
| 2010/0213911 A1* | 8/2010 | Oki ..................... | H02M 3/156 323/283 |
| 2011/0031948 A1* | 2/2011 | Chien ................. | H02M 3/1588 323/282 |
| 2012/0206943 A1 | 8/2012 | Sagneri et al. | |
| 2012/0206946 A1 | 8/2012 | Sagneri et al. | |
| 2014/0003094 A1* | 1/2014 | Sorensen ............. | H02M 3/337 363/21.02 |

FOREIGN PATENT DOCUMENTS

| | | |
|---|---|---|
| JP | 2005-94926 A | 4/2005 |
| JP | 2005094926 | 4/2005 |
| WO | WO 2012/024542 | 2/2012 |
| WO | WO 2012/024542 A2 | 2/2012 |
| WO | WO 2013/072784 | 5/2013 |
| WO | WO 2013/072784 A1 | 5/2013 |

OTHER PUBLICATIONS

M. Kovacevic, A. Knott and M. A. E. Andersen, "Very high frequency interleaved self-oscillating resonant SEPIC converter," 2013 15th European Conference on Power Electronics and Applications (EPE), Lille, 2013, pp. 1-9.*

J. Hu, A. D. Sagneri, J. M. Rivas, Y. Han, S. M. Davis and D. J. Perreault, "High-Frequency Resonant SEPIC Converter With Wide Input and Output Voltage Ranges," in IEEE Transactions on Power Electronics, vol. 27, No. 1, pp. 189-200, Jan. 2012 (Year: 2012).*

International Search Report for PCT/EP2015/053980 dated Jun. 2, 2015.

* cited by examiner (a)

(b)

(a)

(b)

(a) $v_{cmp+}(t)$: 50 mV/div, 1 μs/div (b) $v_{cmp-}(t)$: 50 mV/div, 1 μs/div (c) $v_{out}(t)$: 100 mV/div, 1 μs/div (a) $A\, v_{DS,AC}(t)$ (scaled, no DC): 5 V/div, 1 μs/div (b) $v_{GS}(t)$: 5 V/div, 1 μs/div (a)

POWER CONVERTER AND METHODS OF CONTROLLING A POWER CONVERTER

CROSS REFERENCE TO RELATED APPLICATIONS

This application is a U.S. National Phase Application of PCT International Application Number PCT/EP2015/053980, filed on Feb. 26, 2015, designating the United States of America and published in the English language, which is an International Application of and claims the benefit of priority to European Patent Application No. 14156917.8, filed on Feb. 27, 2014. The disclosures of the above-referenced applications are hereby expressly incorporated by reference in their entireties.

The present invention relates to a new method of power converter regulation, in particular regulation of very high frequency (VHF) power converters operating at frequencies in the MHz range.

BACKGROUND OF THE INVENTION

Reducing the physical size of electronic equipment in power applications is desired in order to add more features into existing products, integrate power converters in places normally unfit for such equipment, and reduce system cost. Increasing the operating frequency of the converter is a direct way of reducing the size of energy storage elements such as bulky capacitors and inductors, which usually dominate the overall converter volume. Due to reduction in energy storage requirements the transient response is dramatically increased. LED lighting applications and point-of-load (PoL) converters particularly benefit from very high frequency (VHF) converters due to size, price, and weight reduction, and faster transient response.

Conventionally, burst mode control is used to control the output voltage or current of resonant power converters. Burst mode control allows the converter designer to optimize resonant power converters for operation in one operating point. The output voltage or current is controlled by turning the resonant power converters on or off as necessary to maintain constant output voltage or current. A disadvantage of burst mode control is that the EMI performance is the same or worse compared to hard switched converters at the same modulation frequency. Typically, the modulation frequency ranges from 20 kHz to 1 Mhz.

Typically, prior art burst mode control is either hysteresis based, or pulse width modulation (PWM) based with constant switching frequency.

With hysteresis and PWM control, fast responses—ideally zero time delays—of the components of the regulation loop are required so that low cost components cannot be used.

The converter start-up circuit must also provide very little delay. As a consequence, passive start-up circuits (which have lower cost) are usually not an option.

Hysteresis based control results in tight output regulation, but requires a high cost, high performance comparator with very small propagation delays.

A conventional hysteretic burst mode control method of controlling a power converter, comprises the steps of
turning the power converter on when an absolute value of a sense voltage is less than or equal to an absolute value of a first reference voltage, and
turning the power converter off when the absolute value of the sense voltage is larger than or equal to an absolute value of a second reference voltage that is larger than the absolute value of the first reference voltage.

Typically, the difference between the first and second reference voltages is a predetermined fixed value.

SUMMARY OF THE INVENTION

The present invention provides a modulation method for obtaining accurate output regulation of a power converter while exploiting inherent delays in the feedback loop.

Contrary to hysteresis on/off control, i.e. hysteretic burst mode control, the new method does not require immediate responses to comparisons of a sense voltage to two reference voltages. Rather, according to the new method, only one reference voltage is used, and delays in the feedback loop are allowed to cause some variation of an output of the power converter. The variation can be predicted and accounted for during the converter design process.

Thus, a new method of controlling a power converter is provided, comprising the steps of
turning the power converter on when an absolute value of a sense voltage is less than or equal to an absolute value of a reference voltage and a first time period has elapsed since a previous turn-off of the power converter, and
turning the power converter off when the absolute value of the sense voltage is larger than or equal to the absolute value of the reference voltage and a second time period has elapsed since a previous turn-on of the power converter.

In the following, the new method is termed phase-shift burst mode control due to the phase shift caused by the first and second time periods. According to the new method, hysteresis is provided in the time domain.

A power converter operating in accordance with the new method is also provided.

Thus, a new power converter is provided, comprising a control circuit coupled to compare a sense voltage with a reference voltage, and having a control output that is coupled to control turn-on and turn-off of the power converter in such a way that
the power converter is turned-on when the absolute value of the sense voltage is less than or equal to the absolute value of the reference voltage and a first time period has elapsed since a previous turn-off of the power converter, and
the power converter is turned-off when the absolute value of the sense voltage is larger than or equal to the absolute value of the reference voltage and a second time period has elapsed since a previous turn-on of the power converter.

The first time period may include a third time period of a predetermined duration that has to elapse from the point in time when the absolute value of the sense voltage drops below the absolute value of the reference voltage until the power converter is turned-on.

The second time period may include a fourth time period of a predetermined duration that has to elapse from the point in time when the absolute value of the sense voltage raises above the absolute value of the reference voltage until the power converter is turned-off.

The predetermined durations of the third and fourth time periods may be different.

Throughout the following disclosure, the process of alternatingly turning a power converter on and off, is termed "modulation" of the power converter, and the time between two consecutive turn-on events is termed a "modulation period", and the rate of turn-on is termed the "modulation frequency".

The sense voltage may correspond to an output voltage of the power converter; or an output current of the power converter; or another desired characteristic of the power converter.

An output current of the power converter is a current consumed by a load connected to an output of the power converter.

The control circuit may perform turn-off of the power converter by turning at least one switch of the power converter off, e.g. by short-circuiting the gate of a Field-Effect-Transistor (FET) to its source; or, the base of a bipolar transistor to its emitter, and turn-on of the power converter by allowing the at least one switch of the power converter to turn-on again, e.g. by opening the short-circuit.

The control circuit may also perform turn-on and turn-off of a resonant power converter by changing the impedance or the loop-gain of the resonant part of the power circuit, whereby the resonant power converter is turned-off by changing the impedance or loop-gain to a first value at which the resonant part of the power circuit does not oscillate, and whereby the resonant power converter is turned-on by changing the impedance or loop-gain to a second value at which the resonant part of the power circuit oscillates.

The control circuit may comprise one or more delays configured to provide at least part of one or more of the respective first and second time periods. Propagation delays in circuit components, such as propagation delays in a comparator, filtering elements, the power circuit, etc., may advantageously be incorporated into the appropriate time period.

The control circuit may comprise a comparator coupled to compare the sense voltage with the reference voltage, and an output of the comparator may constitute the control output that is coupled to control turn-on and turn-off of the power converter, and thus, the delays with which the comparator changes state of its output from high to low and vice versa, in response to changed input(s), constitute part of the respective first and second time periods.

The delays with which the comparator changes state of its output from high to low and vice versa, in response to changed input(s), may provide at least part of the third and fourth time periods.

The output voltage of the power converter may be coupled to signal conditioning circuit, such as a low-pass filter, etc., configured to output the sense voltage.

The power converter may be of any known type of power converters, and in particular any type of VHF power converters, such as square wave power converters, quasi-square wave power converters, resonant transition power converters, resonant power converters, etc.

The power converter may have a plurality of power circuits operating in series and/or in parallel and/or interleaved, e.g. with inputs in series and/or parallel and/or with outputs in series and/or parallel. All or some of the plurality of power circuits may be controlled with a single control circuit.

A resonant power converter may be of any known type of resonant power converters, such as converters comprising: a class E inverter and a class E rectifier, a class DE inverter and a class DE rectifier, a class DE inverter and a class E rectifier, etc.; or, class EF2 (or class φ) converters, resonant Single-Ended Primary-Inductor Converters (SEPIC), etc.

The power converter may be driven by an oscillator, or the converter may be self-oscillating. Further, the power converter may be interleaved.

Basing control of the output of the power converter on a single reference voltage and time periods during which the power converter does not change state from a turned-on state to a turned-off state, or vice-versa, leads to lowered performance requirements for control circuit components as compared to components of conventional control circuits, e.g. utilizing PWM-control or hysteresis control. E.g., low cost components and passive start-up circuits may be used in the new control circuit.

Furthermore, it is possible to include low-pass filtering, or other signal conditioning, of the output voltage for provision of the sense voltage, thus improving signal integrity.

Increasing at least one of the first and second time periods provided by the control circuit lowers modulation frequency of the control output signal controlling the on/off states of the power converter. This in turn increases variation of the output voltage; however, output voltage variations may be lowered by provision of a suitable output filter at the output of the power converter.

Due to the time periods provided by the control circuit, the response time of the control circuit is longer than the response time of hysteresis control. Still, desired regulation is achieved within one modulation cycle.

Conventional control circuits, such as PWM-control or hysteresis control, rely on high-end components and on minimizing time delays in the control circuit, leading to higher cost and lower component availability than for the corresponding components of the new control circuit.

For example, a comparator used in the new control circuit may be 9-10 times slower than a comparator used in a conventional control circuit, e.g. 4.5 ns vs 40 ns.

As further explained below, at least one of, or both of, the first and second time periods may be equal to, or substantially equal to, one fourth the modulation period, e.g. at 50% duty cycle, for example at least one of, or both of, the third and fourth time periods may be equal to, or substantially equal to, one fourth the modulation period, e.g. at 50% duty cycle.

The sense voltage may be a function of the output voltage supplied to a load connected to an output of the power converter; or, the sense voltage may be a function of the output current supplied to a load connected to an output of the power converter; or, the sense voltage may be a function of power, i.e. output voltage times output current, supplied to a load connected to an output of the power converter; etc.

An output capacitor connected to an output of the power converter stabilizes the output voltage supplied by the power converter. The output capacitor is charged during turn-on of the power converter and discharged during turn-off of the power converter. During turn-on, the capacitor is charged with the current supplied by the power stage of the power converter minus the current supplied to the load connected to the output of the power converter. During turn-off, the capacitor is discharged with the load current. Thus, the slope of the voltage ripple $\Delta V_{out}$ developed across the output capacitor as a result of the charging and discharging of the output capacitor depends on the output current. If the output current is low, the slope of the voltage ripple is steep during turn-on of the power converter and low during turn-off of the power converter, and vice versa if the output current is high. This together with the first and second time periods causes the output voltage ripple to vary with varying output current and also causes the mean value of the output voltage $V_{out}$ to vary with varying output current. Correspondingly, the ripple of the output current $I_{out}$ and output power $P_{out}$, and the mean value of output power $P_{out}$ may also vary with varying output current.

This variation may be compensated in various ways in order to lower the amount of variation and making the desired output value more constant and independent of the output current at least within a predetermined output current range.

For example, the control circuit may be configured to compensate a dependence of the sense voltage, and thereby a dependence of the output voltage; or, the output current; or the output power; etc., on the output current, for example by varying the reference voltage in dependence on the output current in such a way that the dependence of the sense voltage on the output current is compensated. For example, an increase in output voltage may be compensated by lowering the reference voltage so that the power converter is turned-on at a lower voltage thereby lowering the resulting output voltage. The change in reference voltage takes place over a plurality of modulation periods. When the load is constant, the reference voltage does not change unless an adjustment of the output, such as the output voltage or current, is performed.

Additionally; or, alternatively, the control circuit may be configured to vary at least one of the first and second time periods in dependence of the output current, whereby the dependence of the sense voltage on the output current is compensated. For example, an increase in output voltage may be compensated by lowering the second time period so that the power converter is turned-on during a shorter time period thereby lowering the resulting output voltage. When the load is constant, the first and second time periods do not change.

BRIEF DESCRIPTION OF THE DRAWINGS

Below, the new method and the new power converter are explained in more detail with reference to the drawings in which various resonant examples of the new power converter are shown. In the drawings.

DETAILED DESCRIPTION OF EMBODIMENTS

Figure 1:
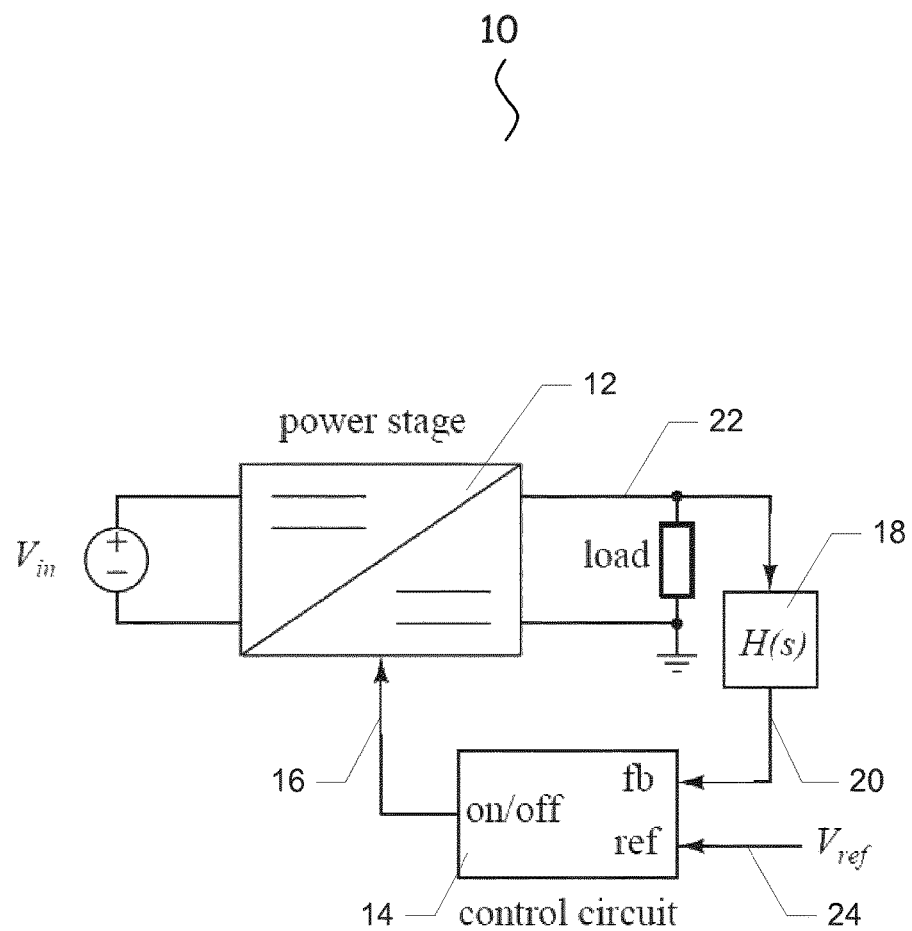
FIG. 1 shows a schematic diagram of a resonant power converter with the new control circuit.

The accompanying drawings are schematic and simplified for clarity, and they merely show details which are essential to the understanding of the new resonant power converter, while other details have been left out. The new resonant power converter according to the appended claims may be embodied in different forms not shown in the accompanying drawings and should not be construed as limited to the examples set forth herein.

Like reference numerals refer to like elements throughout. Like elements may, thus, not be described in detail with respect to the description of each figure.

FIG. 1 shows a schematic block diagram of a resonant power converter 10 controlled in accordance with the new method. The illustrated resonant power converter 10 comprises a VHF power circuit 12, a control circuit 14 with a control output 16, and a signal conditioning circuit 18 providing a sense voltage 20 based on and corresponding to the output voltage 22.

The control circuit 14 is coupled to compare the sense voltage 20 with a reference voltage 24.

Alternatively, the sense voltage 20 may be provided by a current sensor, such as a resistor, a hall element, etc., coupled so that the sense voltage corresponds to an output current of the resonant power converter 10.

The control circuit 14 has a control output 16 that is coupled to control turn-on and turn-off of the VHF power circuit 12 of the resonant power converter.

In the illustrated examples, the output voltage and the sense voltage have positive values, so that the absolute value of the sense voltage or the output voltage is equal to the value itself.

The VHF power circuit 12 of the resonant power converter 10 is turned-on when the sense voltage 20 is less than or equal to the reference voltage 24 and a first time period has elapsed since a previous turn-off of the VHF power circuit 12. The VHF power circuit 12 of the resonant power converter 10 is turned-off when the sense voltage 20 is larger than or equal to the reference voltage 24 and a second time period has elapsed since a previous turn-on of the VHF power circuit 12.

The VHF power circuit 12 may be of any known resonant power converter topology with a frequency of operation in the MHz range, such as at or above 20 MHz, such as at or above 30 MHz, such as in the 30 MHz-300 MHz range, such as converters comprising: a class E inverter and a class E rectifier, a class DE inverter and a class DE rectifier, a class DE inverter and a class E rectifier, etc.; or, class EF2 (or class ϕ) converters, resonant SEPIC converters, etc.

The resonant power converter may be driven by an oscillator, or the converter may be self-oscillating. Further, the resonant power converter may be interleaved.

Inherent signal propagation delays of the components of the control circuit 14 forms parts of the first and second time periods, and the inherent signal propagation delays may form the entire first and second time periods. Additionally, one or more delay circuits may provide part of the first time period and/or part of the second time period, namely part of the third time period and/or part of the fourth time period.

The control circuit 14 may comprise a comparator that is coupled to compare the sense voltage 20 with the reference voltage 24, and having a comparator output that is the control output 16.

The delays with which the comparator changes state of its output from high to low and vice versa, in response to changed input(s), constitute part of the respective first and second time periods, namely part of the third time period and/or part of the fourth time period.

The signal conditioning circuit 18 may be a low-pass filter configured to output the sense voltage.

The control output 16 may be coupled to control turn-off of at least one power switch (not shown) of the resonant power converter 10 thereby turning the resonant power converter off.

Figure 2:
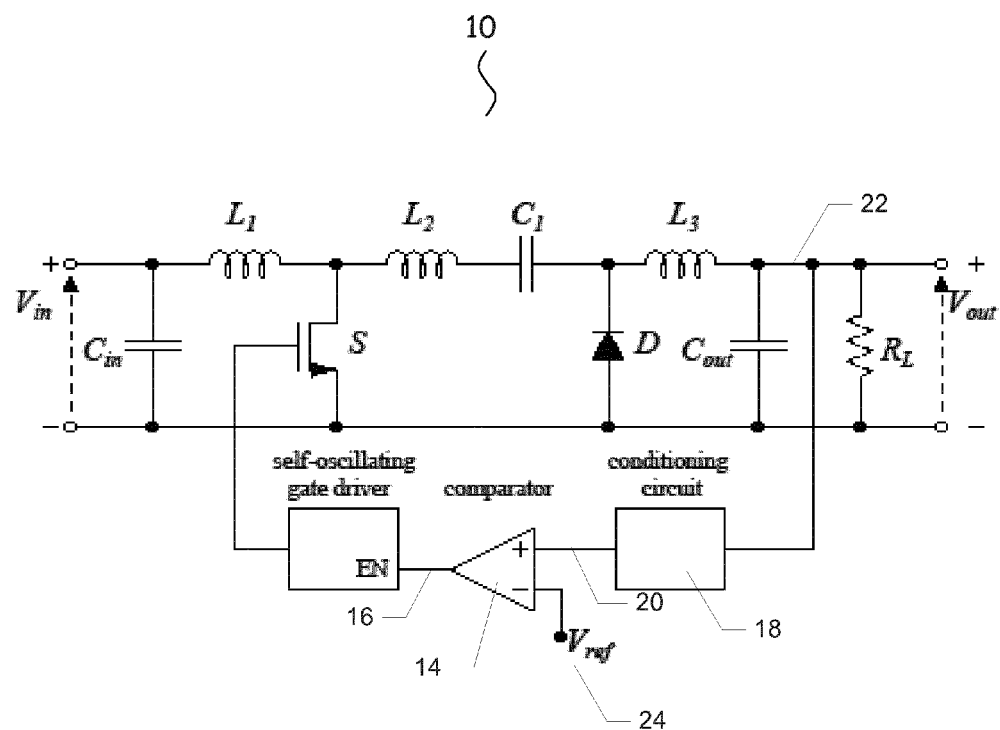
FIG. 2 shows a schematic circuit diagram of an exemplary new resonant power converter.
Figure 3:
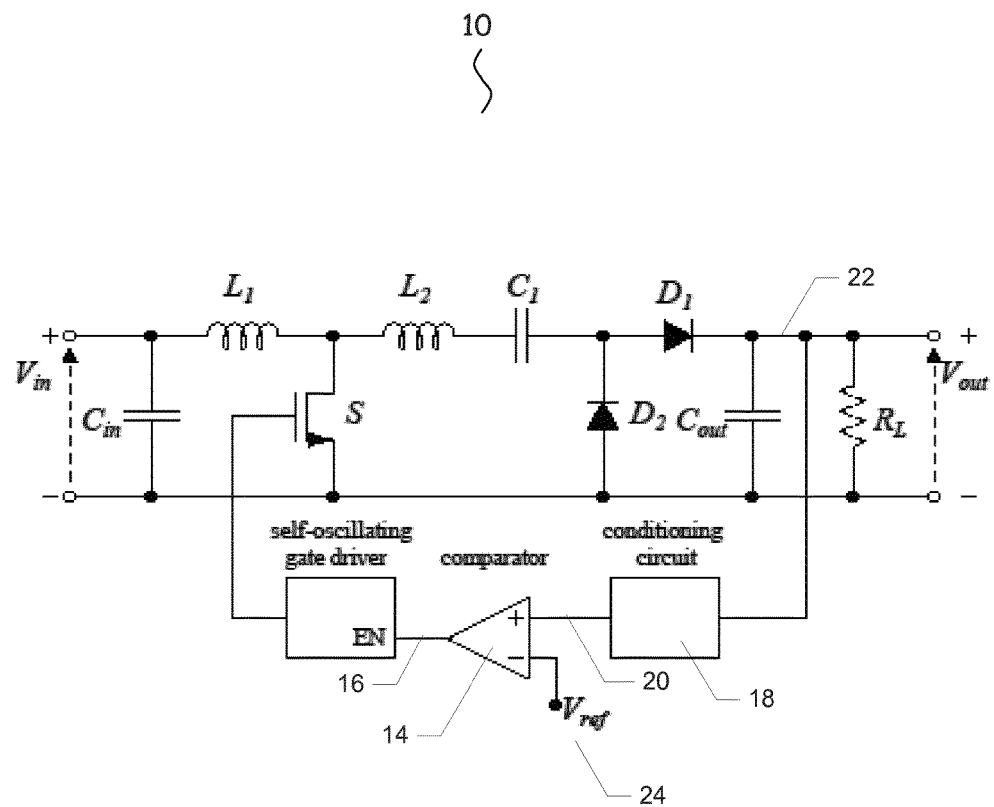
FIG. 3 shows a schematic circuit diagram of an exemplary new resonant power converter.

This is illustrated in the class E inverter based resonant power converters shown in FIGS. 2 and 3. The only difference between the resonant power converter of FIG. 2 and the resonant power converter of FIG. 3 is that inductor $L_3$ of FIG. 2 has been substituted by rectifier $D_1$ in FIG. 3.

Alternatively, or additionally, the control output 16 may be coupled to control other parts of the resonant power converter circuit than the power switches, e.g. by enabling and disabling energy transfer from the input to the output of the resonant power converter 10, e.g. by turning the resonant power converter on and off by changing the impedance or the loop-gain of the resonant part of the power circuit, whereby the resonant power converter is turned-off by changing the impedance to a first value at which the power circuit does not oscillate, and whereby the resonant power converter is turned-on by changing the impedance to a second value at which the power circuit oscillates.

Figure 4:
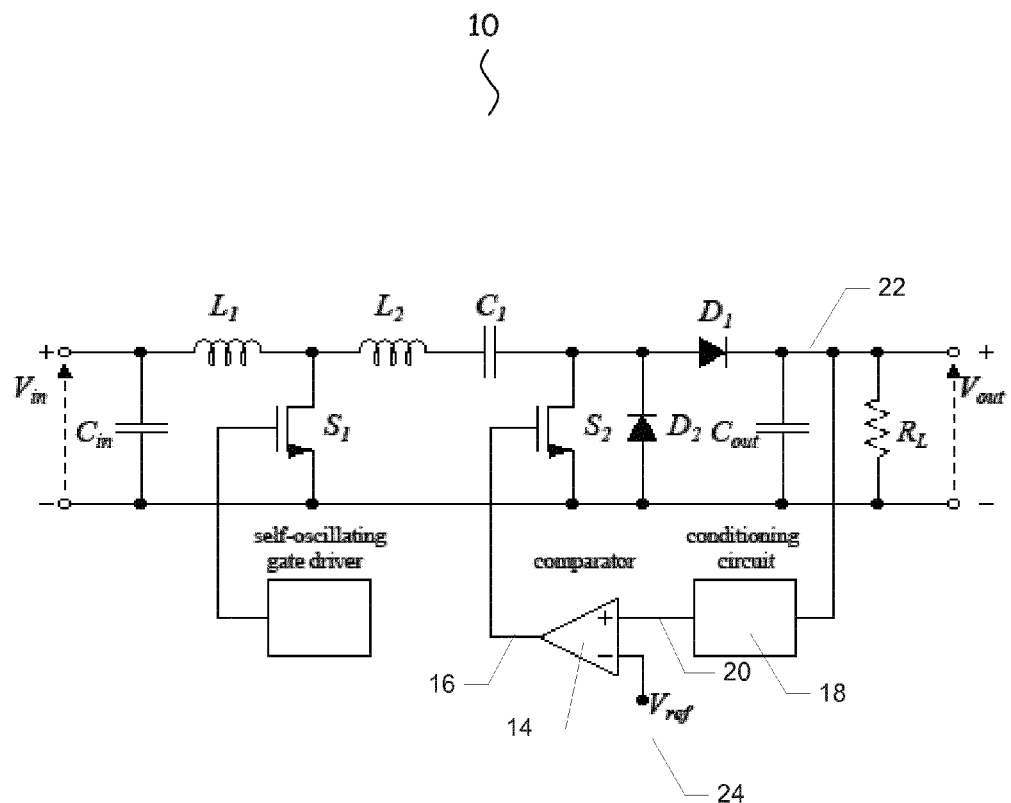
FIG. 4 shows a schematic circuit diagram of an exemplary new resonant power converter.
Figure 5:
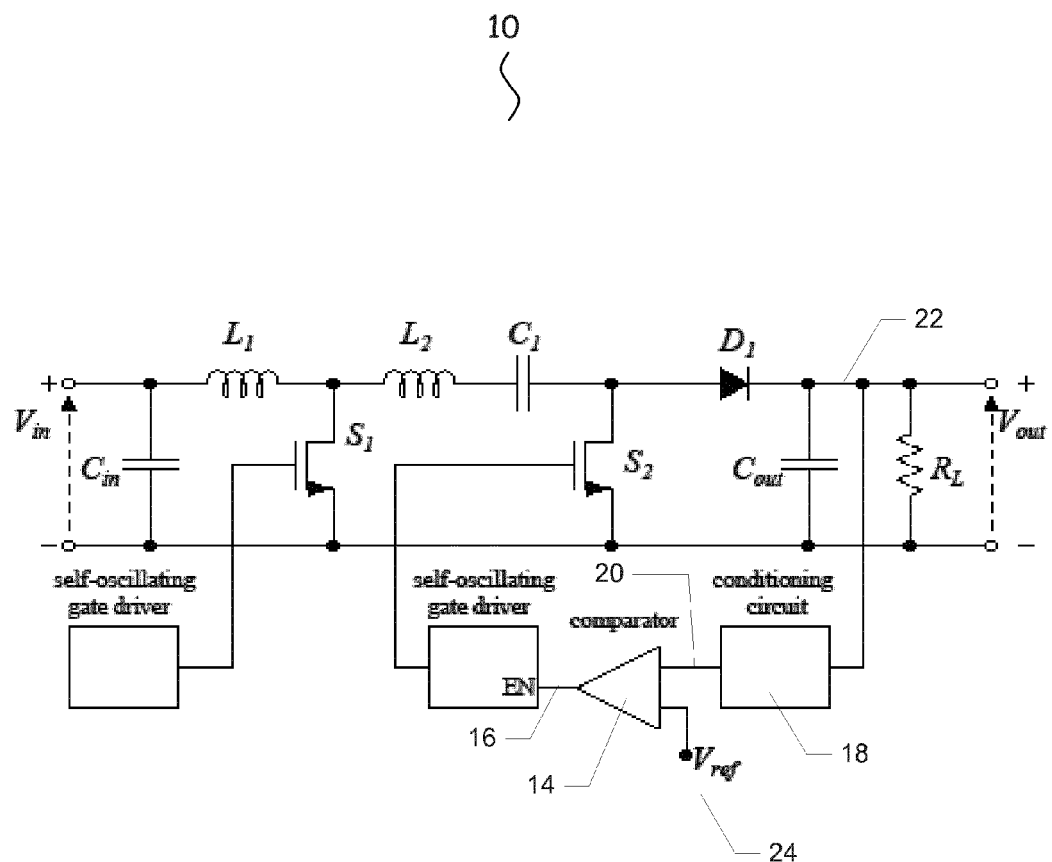
FIG. 5 shows a schematic circuit diagram of an exemplary new resonant power converter.

This is illustrated in FIGS. 4 and 5 showing a class E inverter based resonant power converter similar to the class E inverter based resonant power converters shown in FIG. 3 except for the fact that the control output 16 turns $S_2$ on and off.

In FIG. 4, the resonant part of the resonant power converter 10 does not oscillate when switch $S_2$ is turned-on, and the resonant part of the resonant power converter 10 oscillates and operates like the resonant power converter 10 of FIG. 3 when switch $S_2$ is turned-off.

In FIG. 5, the functions of rectifier D2 and switch S2 of FIG. 4 are combined in switch S2 functioning as a synchronous rectifier in FIG. 5 when the second self-oscillating gate driver is enabled so that the resonant power converter is turned on.

Figure 6:
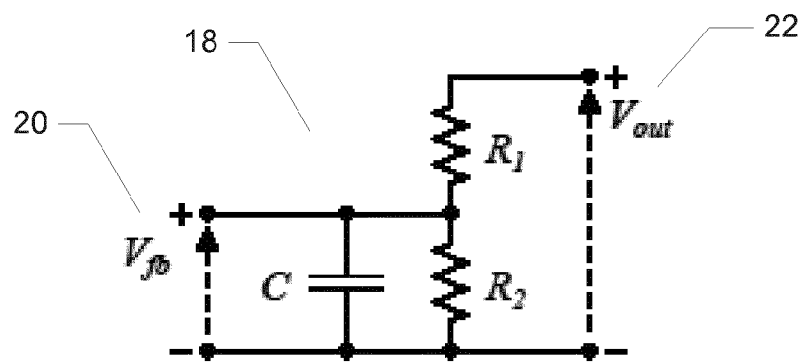
FIG. 6 shows exemplary signal conditioning circuits.
Figure 6:
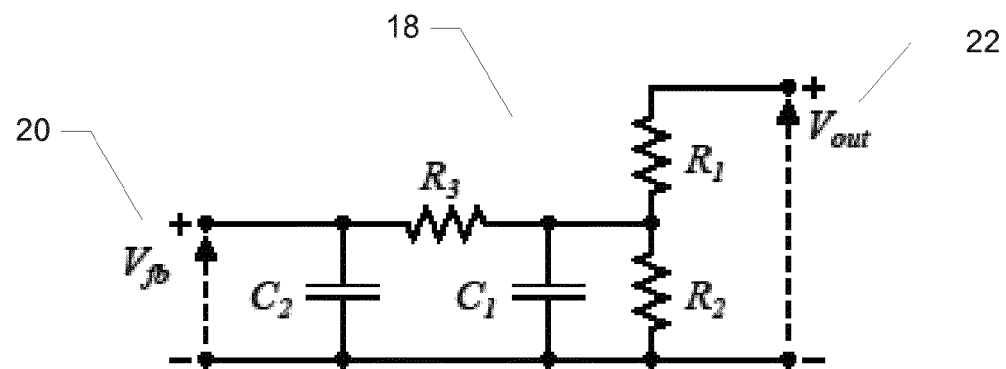

FIG. 6 shows circuit diagrams of two examples of low-pass filters that may constitute the signal conditioner 18.

The signal conditioners shown in FIGS. 6(a) and (b) may be substituted with any suitable signal conditioner chosen from other signal conditioner designs available to the person skilled in the art.

Figure 7:
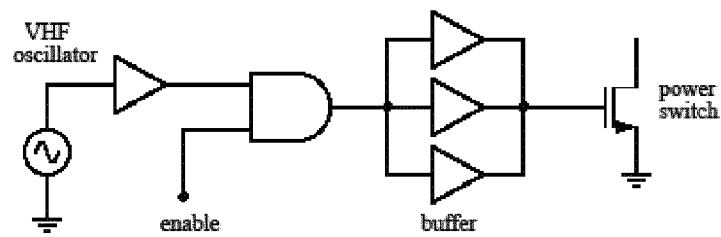
FIG. 7 shows exemplary switch drivers.
Figure 7:
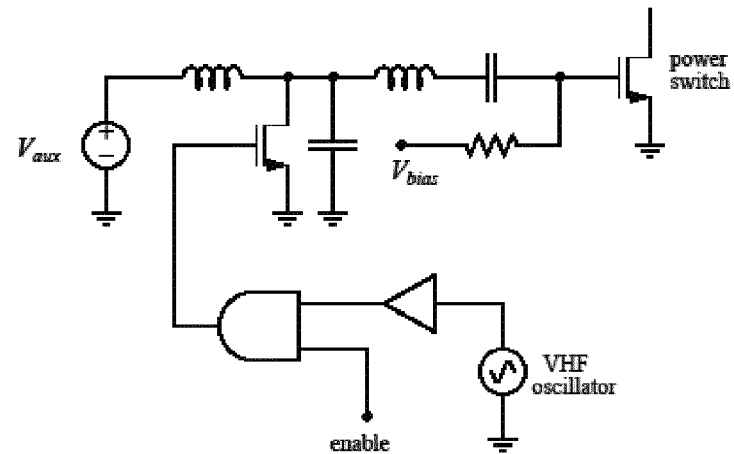

Examples of self-oscillating gate drivers are shown in FIG. 7.

In FIG. 7(a), a low enable signal keeps the gate of the power switch at zero voltage, whereby oscillation of the power circuit is inhibited, while a high enable signal allows propagation of the VHF oscillator signal driving the gate of the power switch causing the power circuit to oscillate.

In FIG. 7(b), a low enable signal switches switch transistor $S_{aux}$ off and keeps the gate of the power switch at a constant voltage, whereby oscillation of the power circuit is inhibited, while a high enable signal allows propagation of the VHF oscillator signal driving the switch transistor $S_{aux}$ on and off thereby driving the power switch on and off causing the power circuit to oscillate.

The gate drivers shown in FIGS. 7(a) and (b) may be substituted with any suitable gate driver chosen from other gate driver designs available to the person skilled in the art.

Figure 8:
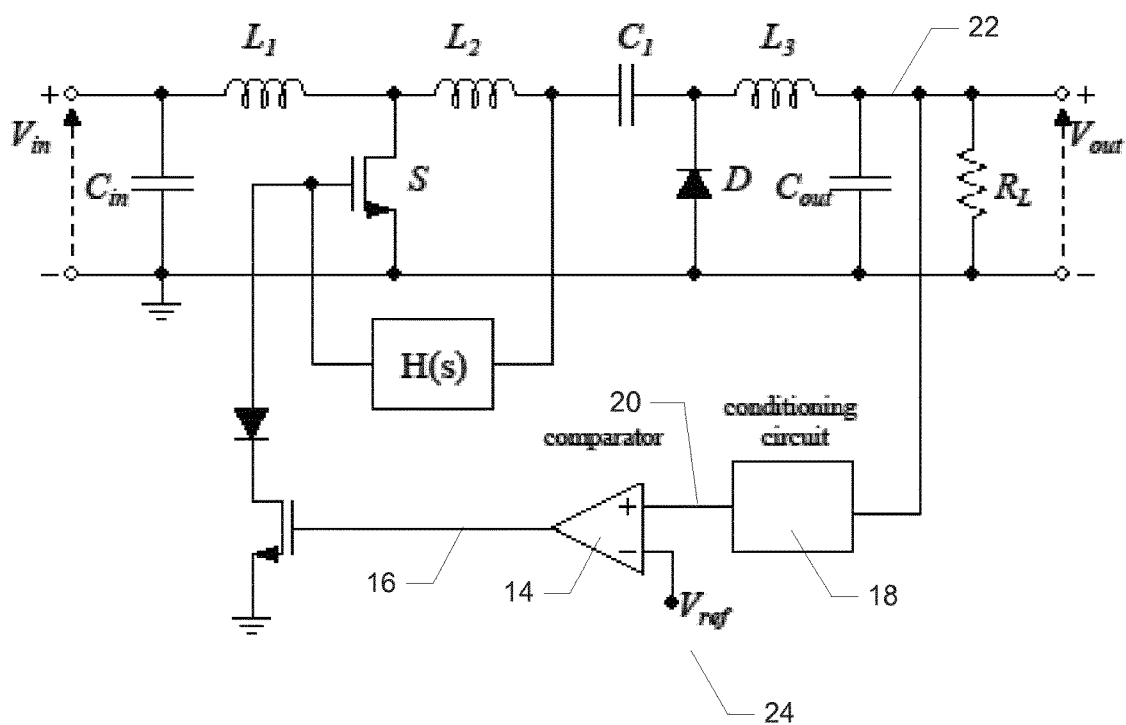
FIG. 8 shows a schematic circuit diagram of an exemplary new resonant power converter with a stop circuit.
Figure 9:
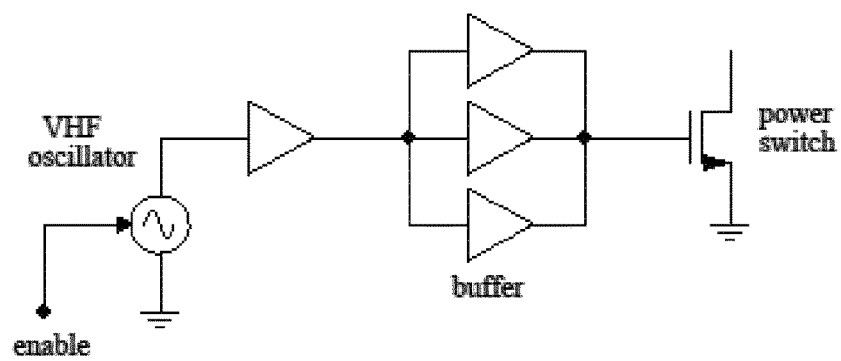
FIG. 9 shows a switch driver with oscillator turn-off.
Figure 10:
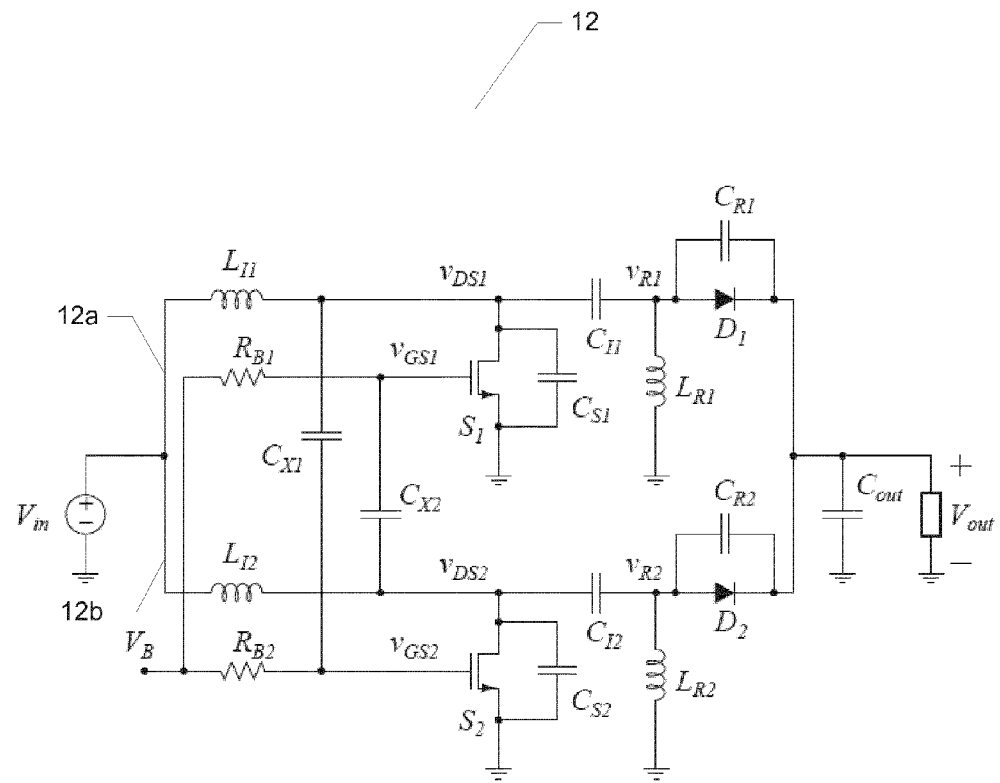
FIG. 10 shows a power circuit diagram of a VHF interleaved self-oscillating resonant SEPIC converter.

FIG. 8 shows a schematic circuit diagram of an exemplary new resonant power converter with a stop circuit, FIG. 9 shows a switch driver with oscillator turn-off, FIG. 10 is a circuit diagram of a power circuit 12 of an interleaved self-oscillating resonant SEPIC converter, wherein two power circuits 12a, 12b drive each other via capacitive coupling $C_{X1}$ and $C_{X2}$ between the switches $S_1$ and $S_2$ and operate in interleaved mode.

The power circuits are substantially identical, i.e.:

$$L_{I1}=L_{I2}=L_I$$

$$C_{I1}=C_{I2}=C_I$$

$$C_{X1}=C_{X2}=C_X$$

$$C_{S1}=C_{S2}=C_S$$

The values of the most important parasitic components of the semiconductor devices, namely diode junction capacitors and parasitic capacitors of the semiconductor switches, are included in determination of operating frequency of the resonant power converter. The oscillation frequency $f_S$ is determined mainly by the inductance $L_I$ and the total capacitance seen from the drain when the rectifiers are shorted, $C_{DS,tot}$ $$f_s = \frac{1}{2\pi\sqrt{L_I C_{DS,tot}}}$$

where $$C_{DS,tot} = C_I + C_{OSS} + C_S + C_X \| C_{ISS}$$

$$C_{OSS} = C_{DS} + C_{DG}$$

$$C_{ISS} = C_{GS} + C_{DG}$$

Figure 11:
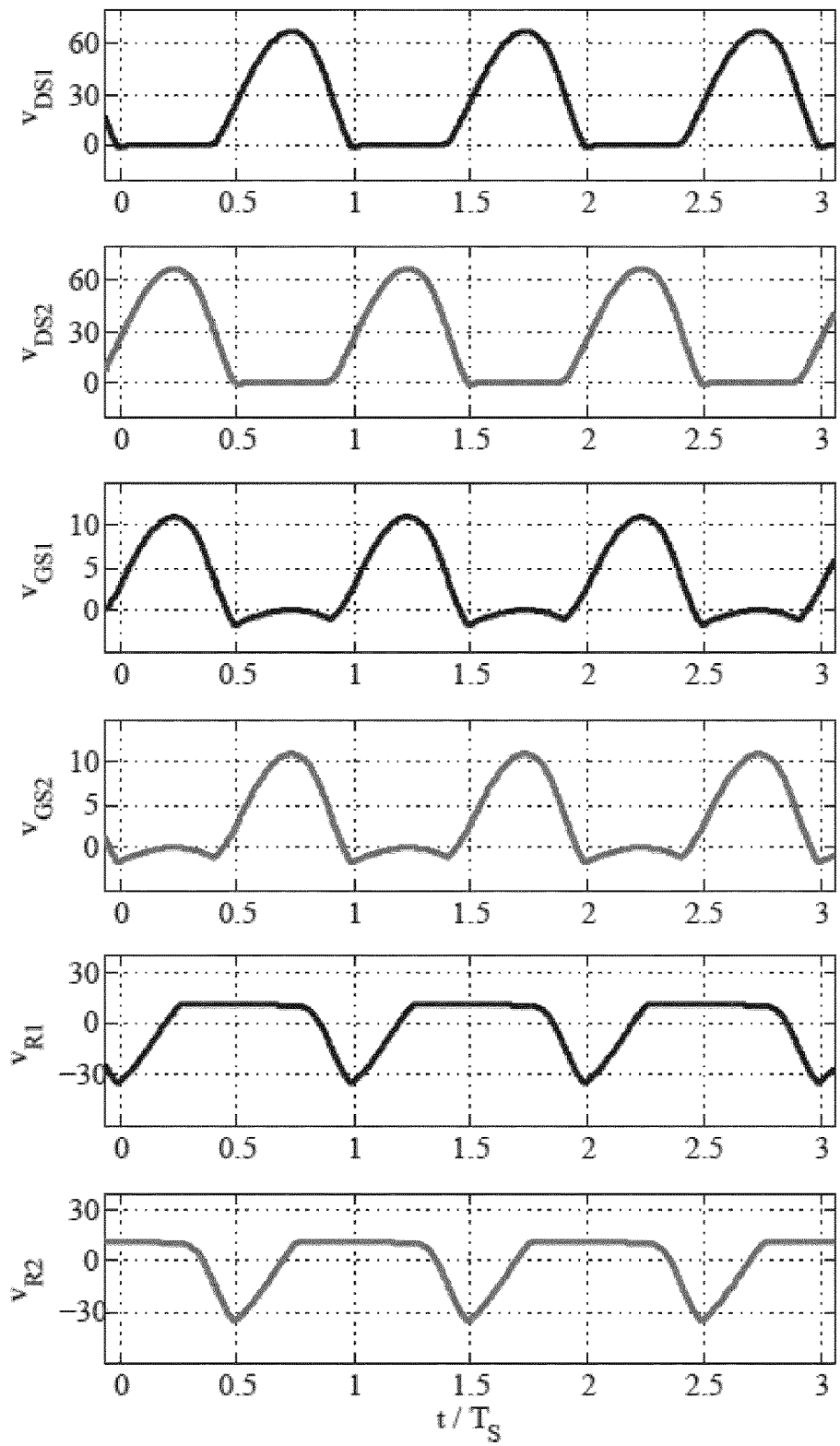
FIG. 11 is a plot of simulated waveforms of the power circuit shown in FIG. 10.

Oscillations start once the gate voltages of the MOSFET switches $S_1$ and $S_2$ become slightly higher than the MOSFET threshold voltage. Simulated waveforms of the resonant power circuit of FIG. 10 are shown in FIG. 11. Ideally, respective waveforms of the two interleaved power converters are identical and shifted 180° with relation to each other.

If VHF ripple is neglected, the converter output can be modeled as a current source with the current value of $I_O$. When an on/off modulation is applied on the converter, the current supplied by the converter $i_{conv}$ to $C_{out}$ and the load may be approximately modeled as a current square wave:

$$i_{conv} = \begin{cases} I_0, & \text{when the converter is ON} \\ 0, & \text{when the converter is OFF} \end{cases}$$

Output current $I_{out}$ is equal to average value of $i_{conv}$ over one modulation cycle. The resulting current going into $C_{out}$ is $i_{conv}-I_{out}$, which has no DC component in steady state. If parasitics of $C_{out}$ are negligible, the resulting $V_{out}$ voltage waveform is a triangular wave. Assuming that turn-on and turn-off delays are independent of the output voltage rate of change, the output voltage ripple is $$\Delta V_{out} = \frac{I_{out}}{C_{out}} t_{D,on} + \frac{I_0 - I_{out}}{C_{out}} t_{D,off}$$

where $t_{D,on}$ is the fourth time period and $t_{D,off}$ is the third time period, i.e. $t_{D,on}$ and $t_{D,off}$ are the control loop turn-on and turn-off delays, respectively, from the sense voltage crossing the reference voltage and to turn-on or turn-off, respectively, of the power converter. If the control circuit's delays are constant, the equation shows that $V_{out}$ is a linear function of $I_{out}$, and the longer delay defines $V_{out,max}$. In the special case of $t_{D,on}$ and $t_{D,off}$ being equal, $V_{out}$ is independent of $I_{out}$. At any given load, the offset of $V_{out}$: $\Delta V_{out,off}$, and $f_M$ are determined from the values of $C_{out}$ and the delays $t_{D,on}$ and $t_{D,off}$ by:

$$\Delta V_{out,off} = \frac{\Delta V_{out}}{2} \frac{t_{D,on} - t_{D,off}}{t_{D,off} + t_{D,on}} \text{ and}$$

$$f_M = \frac{I_0}{C_{out} \Delta V_{out}} \frac{I_{out}}{I_0} \left(1 - \frac{I_{out}}{I_0}\right)$$

Modulation frequency is highest at 50% duty cycle, i.e. the power converter is turned on half the time:

$$f_{M,max} = \frac{1}{2(t_{D,on} + t_{D,off})}$$

$I_0$ is not known from values of circuit components. An approximate value of $I_0$ can be determined from Spice simulations. Once $I_0$ is obtained, the output filter and the feedback circuit need to be designed to provide a desired modulation frequency $f_M$ at a specified load.

Figure 12:
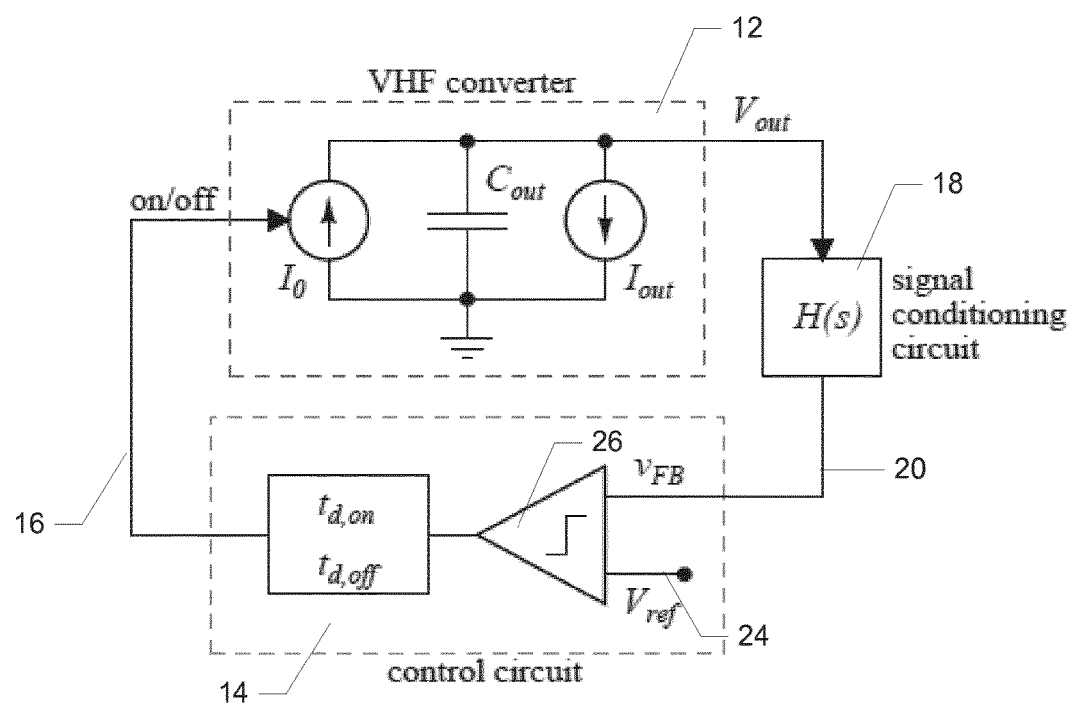
FIG. 12 shows a schematic circuit diagram of a model of a new resonant power converter used for calculation of component values.

FIG. 12 shows a block diagram of such a low frequency model of a resonant power. The VHF power circuit 12 is modelled as an on-off controllable DC current source.

Figure 13:
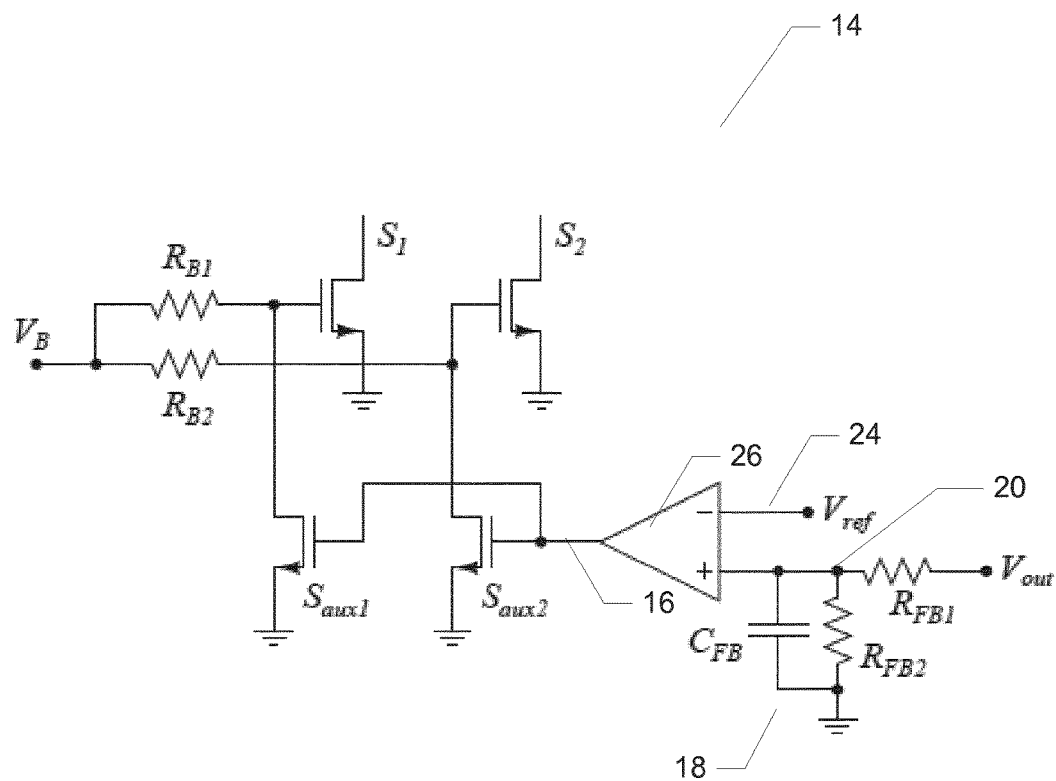
FIG. 13 shows a circuit diagram of a control circuit used to control the power circuit shown in FIG. 10.

The conditioning circuit 18 at the input of the control circuit 14, see FIG. 13, has a simple transfer function:

$$H(s) = \frac{A_{FB}}{1 + s\tau_{FB}}$$

Where $$A_{FB} = \frac{R_{FB2}}{R_{FB1} + R_{FB2}}$$

$$\tau_{FB} = \frac{R_{FB1} R_{FB2}}{R_{FB1} + R_{FB2}} C_{FB}$$

The comparator 26 of the control circuit 14 model is ideal; the propagation delay of the real comparator is added into the delay block. The delay block is represented by two different time delays, since the shutdown of the power circuit is significantly faster than the start-up sequence. This is because shutdown is performed by the auxiliary switches $S_{aux1}$ and $S_{aux2}$, while during start-up $C_{ISS}$ is passively charged from the bias voltage $V_B$ through the biasing resistors.

FIG. 13 shows the control circuit 14. The sense voltage 20 is low-pass filtered in H(s), a voltage divider/low pass filter 18 formed by $R_{FB1}$, $R_{FB2}$, and $C_{FB}$, and input to the comparator 26. The comparator output 16 turns the switches $S_{aux1}$ and $S_{aux2}$ on and off in response to the voltage difference at the comparator inputs. When $S_{aux1}$ and $S_{aux2}$ are on, $v_{GS1}$ and $v_{GS2}$ are zero and the power circuit oscillations are inhibited. Once $S_{aux1}$ and $S_{aux2}$ are off, $C_{ISS1}$ and $C_{ISS2}$ are charged through $R_{B1}$ and $R_{B2}$, whereby $v_{GS1}$ and $v_{GS2}$ start to increase from 0 to $V_B$. After the first time period, when $v_{GS1}$ and $V_{GS2}$ exceed the power MOSFET threshold voltage $V_{th}$, switches $S_1$ and $S_2$ enter saturation and initiate oscillations in the power circuit. H(s) has two primary purposes: to filter high frequency noise and adjust the feedback voltage level. It also contributes to propagation delay in the feedback loop.

Figure 14:
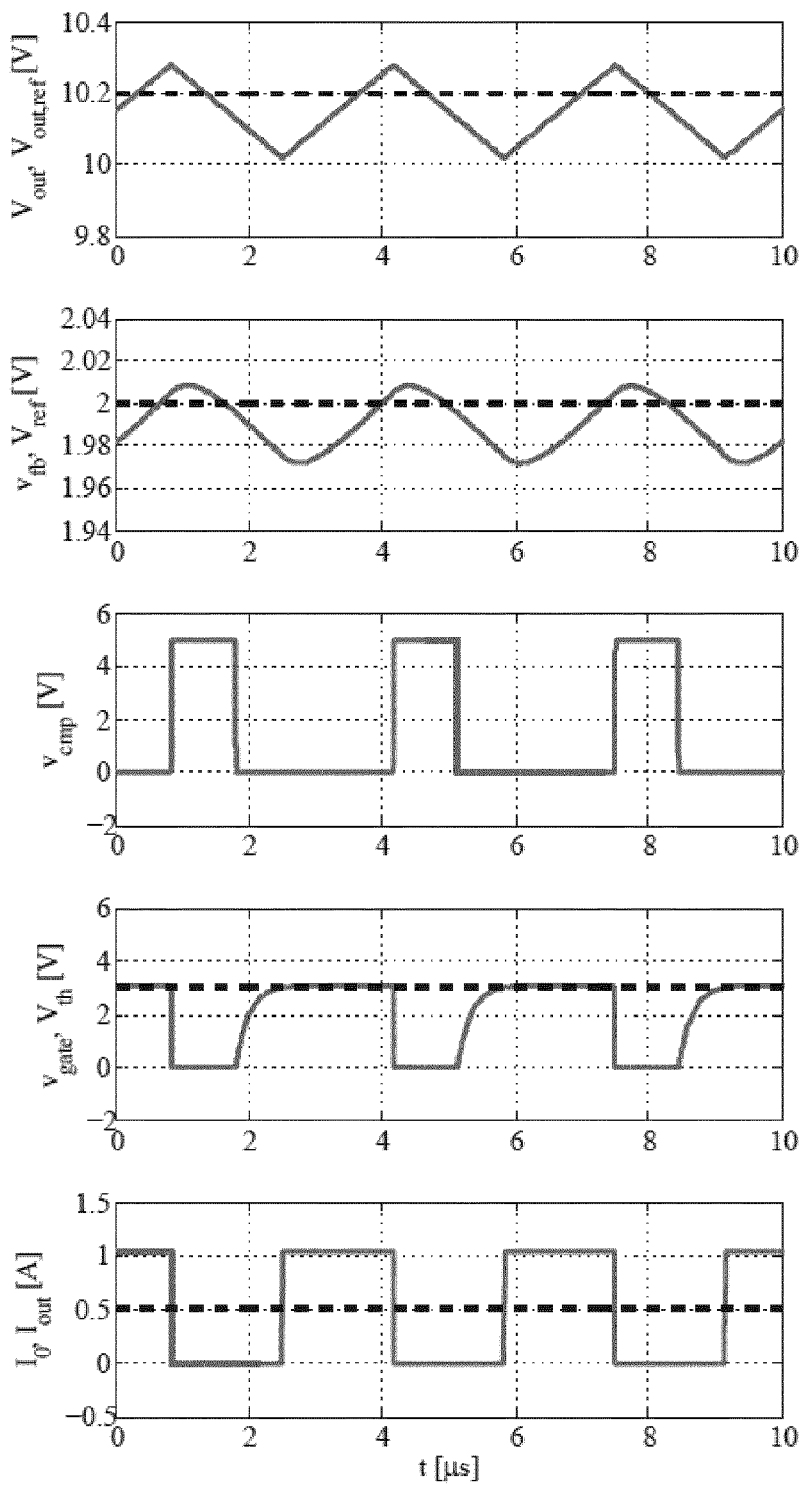
FIG. 14 is a plot of characteristic waveforms of the model shown in FIG. 12.

In FIG. 14, characteristic voltage and current levels from a numerical example of the model are shown, where
$C_{out}$=3.3 µF
$I_0$=1.04 A, $I_{out}$=0.52 A
$R_{FB2}$=2 kΩ, $R_{FB1}$=8.2 kΩ
$C_{FB}$=22 pF
$t_{d,on}$=700 ns+170 ns=870 ns
$t_{d,off}$=170 ns The parameters are chosen to approximate the experimental setup described below. $v_{gate}(t)$ represents the gate voltages of $S_1$ and $S_2$ with removed VHF component. $V_{out}(t)$ passes through the single pole transfer function H(s) and results in a distorted triangular waveform $v_{FB}(t)$. Average value of $v_{FB}(t)$ is slightly lower than the reference $V_{ref}$ voltage, which is due to $t_{d,on}>t_{d,off}$. This is also the cause of the duty cycle of the comparator output $v_{cmp}(t)$ to be lower than 50%. Since the referent output voltage is 10 V, a small offset can be observed in $V_{out}(t)$. This offset is dependent on the duty cycle of the power circuit, the time difference $t_{d,on}-t_{d,off}$, and $C_{out}$. $t_{d,on}$ depends on the voltage difference between $V_B$ and $V_{th}$. Obtained modulation frequency is very close to 300 kHz.

In order to verify the analysis explained above, a 10.5 W prototype converter with regulation of the output voltage was produced and the measurements for the prototype converter is disclosed below.

Figure 15:
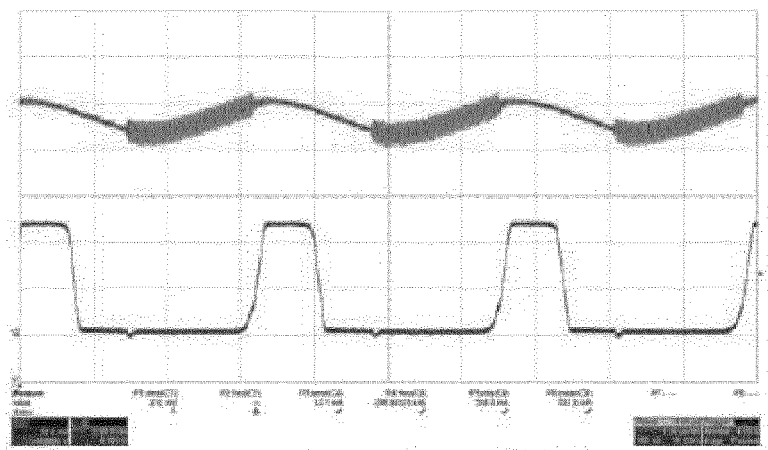
FIG. 15 is a plot of experimental waveforms of the control circuit shown in FIG. 13.
Figure 15:
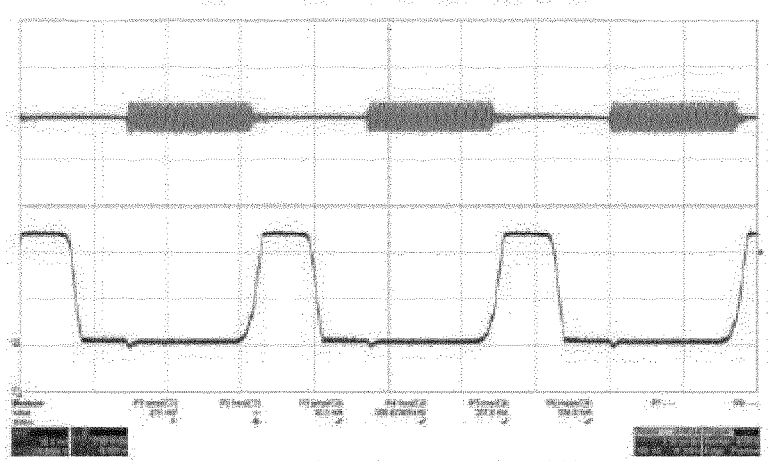
Figure 15:
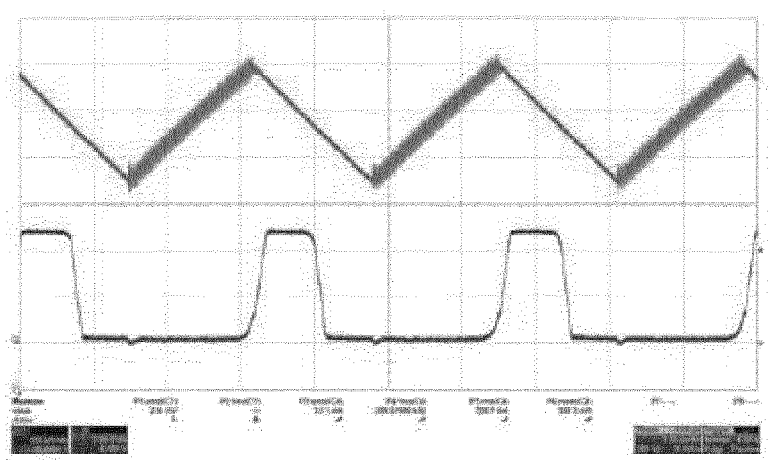

Plots of drain, gate, and rectifier voltages in the power circuit are shown in FIG. 15. The drain and rectifier voltages were measured with capacitance of 2.2 pF in series with an oscilloscope probe, in order to reduce influence of the probe to the power circuit. This introduces attenuation of A=0.19 in the measurement and removes the DC component of the measured voltages. Component values of the power circuit are listed in Table I. Switching frequency of the power circuit is $f_S$=49 MHz. Open loop output voltage and output voltage and current are $V_{out}$=10.2 V and $I_0$=1.04 A, respectively.

When the duty cycle of 50% is obtained, $I_{out}$=0.5 $I_0$=0.52 A. Plots of the waveforms of the relevant voltages in the converter for this case are shown in FIG. 9. Modulation frequency $f_M$ is at its maximum value of 300 KHz at 50% duty cycle, and drops as the duty cycle moves away from 50%. In addition, under these conditions output voltage ripple $\Delta V_{out,pp}$ is at its maximum as well.

The comparator used in the circuit is AD8468 from Analog Devices. The component datasheet specifies 40 ns propagation delay. For comparison, a high speed TLV3501 comparator has a 4.5 ns propagation delay, which is a reduction by a factor of 9. This is by no means a limit since there are other significant contributors as well (conditioning and power circuit on-off circuit). This delay may be increased even further at a cost of a lower modulation frequency $f_M$ and higher output voltage ripple for a given $C_{out}$.

Figure 16:
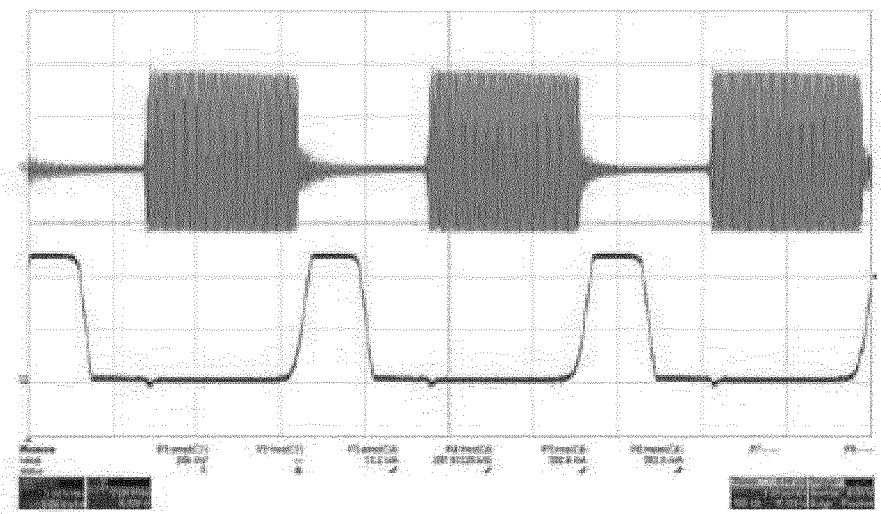
FIG. 16 is a plot of experimental waveforms of the power circuit shown in FIG. 10, FIG. 17($a$) shows a plot of converter efficiency as a function of output power and ($b$) shows a plot of output voltage offset as a function of the load.
Figure 16:
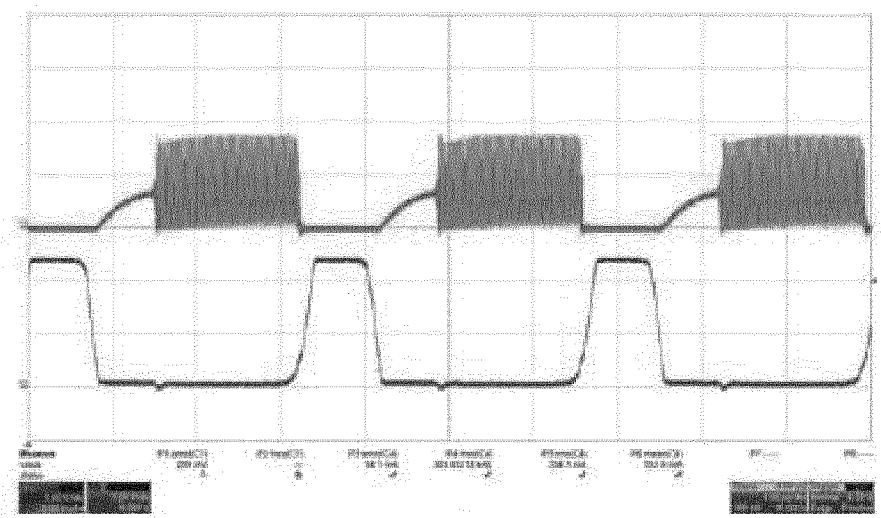

FIGS. 15 and 16 illustrate relationships between the signals in time domain, $V_{cmp+}$, $v_{cmp-}$, $v_{GS}$, $v_{DS}$, and $v_{out}$ (upper waveforms) with respect to the comparator output (lower waveforms). High output voltage ripple is caused by a small output filtering capacitance ($C_{out}$=3.3 pF).

Figure 17:
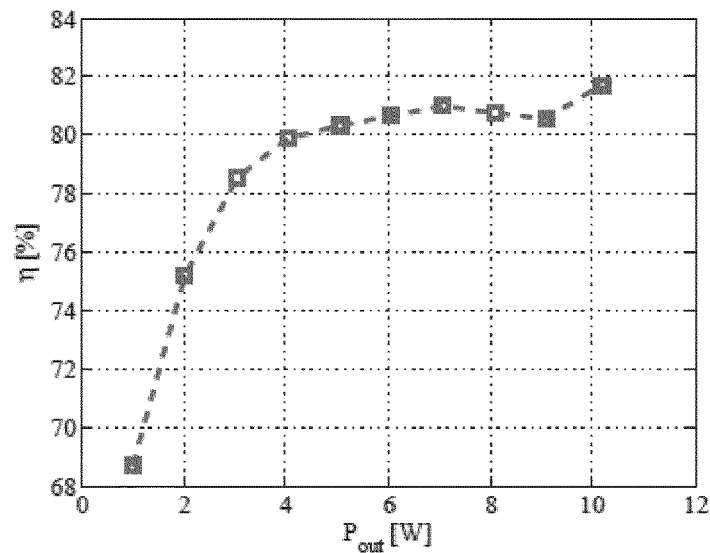
Figure 17:
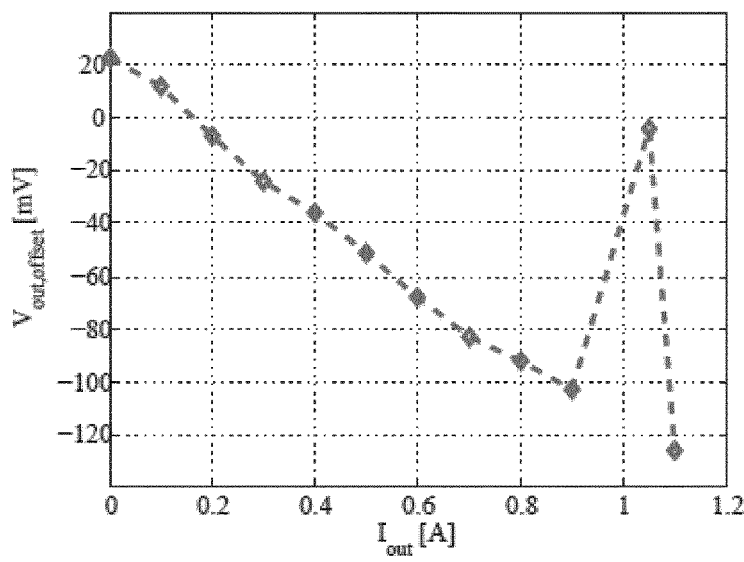

Efficiency of the converter is shown in FIG. 17(a) as a function of output power. Since $f_M$ is allowed to drop significantly under light load conditions, efficiency is maintained high over wide load range (η>75% above 20% load) with peak efficiency above 81%.

Since the control is based on phase shift, a small DC error is introduced in the value of $v_{out}$, which varies with the load. If the output voltage ripple is assumed triangular (which is reasonable since $i_{conv}$ is a current square wave), the peak values of $v_{out}$ are determined as:

$$V_{out+} = V_{out,ref} + \frac{I_0 - I_{out}}{C_{out}} \Delta t_+$$

$$V_{out-} = V_{out,ref} + \frac{-I_{out}}{C_{out}} \Delta t_-$$

So that the offset of $V_{out}$ is determined by $$V_{out,offset} = V_{out,ref} - \frac{\Delta V_{out+} + \Delta V_{out-}}{C_{out}} \Delta t_-$$

$V_{out,ref}$ is a target value for the output voltage set by $V_{ref}$ and $R_{FB1}$-$R_{FB2}$ voltage divider. $\Delta t_+$ and $\Delta t_-$ are the time delays from a point when $v_{out}$ crosses $v_{out,ref}$ to a point where $v_{out}$ reaches its maximum and minimum value, respectively. Depending on the variables in these equations, $v_{out,offset}$ may be either positive or negative, and decreases with $I_{out}$. Measured dependence of $\Delta v_{out}$ is shown in the lower plot of FIG. 17. Both the offset and the output ripple are reduced with increase in $C_{out}$, while the switching frequency will be reduced.

A comparison between the model disclosed above and experimental results show close, but not perfect matching. The reasons for this are subjects of further investigation; it is assumed that imperfections in the active components and tolerances of the passive components are the main contributors. Still, the model gives significant insight into the system operation, and can be used as a good estimate during the converter design.

Compared to hysteresis based burst mode control, the new method of controlling the resonant power converter allows use of a significantly slower and less expensive components in the control circuit, which is of importance for cost sensitive applications such as LED lighting and PoL converters. The illustrated power circuits and control circuits were implemented using only low cost commercially available components, with peak efficiency above 81% and high efficiency over wide load range.

Figure 18:
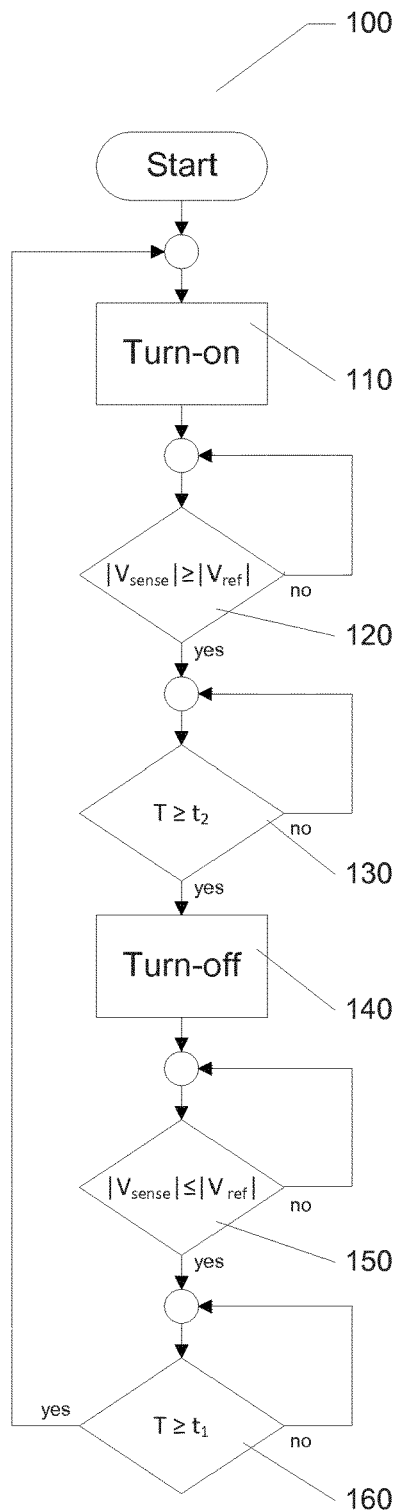
FIG. 18 is a flowchart of the new method.

FIG. 18 is a flowchart 100 of the new method of controlling a resonant power converter. The method starts with method step 110 wherein the resonant power converter is turned on.

When the resonant power converter is turned on, the output voltage and/or output current increases. A sense voltage is provided in the resonant power converter that corresponds to the output voltage or output current, and a reference voltage is provided in the resonant power converter that corresponds to a desired resulting output voltage or output current of the resonant power converter.

According to method step 120, the output voltage and/or output current continue to increase until the corresponding sense voltage $V_{sense}$ is equal to or larger than the reference voltage $V_{ref}$, and according to method step 130, the output voltage and/or output current continue to increase until also a second time period $t_2$ has elapsed since a previous turn-on of the resonant power converter.

Thus, when the sense voltage $V_{sense}$ is equal to or larger than the reference voltage $V_{ref}$, and a second time period $t_2$ has elapsed since a previous turn-on of the resonant power converter, the resonant power converter is turned-off in method step 140.

When the resonant power converter is turned on, the output voltage and/or output current decreases.

According to method step 150, the output voltage and/or output current continue to decrease until the corresponding sense voltage $V_{sense}$ is equal to or less than the reference voltage $V_{ref}$, and according to method step 160, the output voltage and/or output current continue to decrease until also a first time period $t_1$ has elapsed since a previous turn-off of the resonant power converter.

Thus, when the sense voltage $V_{sense}$ is equal to or less than the reference voltage $V_{ref}$, and a first time period $t_1$ has elapsed since a previous turn-off of the resonant power converter, the resonant power converter is turned-off in method step 110.

In the following, properties of the phase-shift burst mode control method for very high frequency (VHF) DC-DC converters are compared with a conventional control method with hysteresis based on comparison of a sense voltage with two threshold values. Again, an on-off controllable current source is used to model the low-frequency behaviour of VHF converters. Large output capacitance is used for output voltage filtering. The model is shown in FIG. 19(a).

Figure 19:
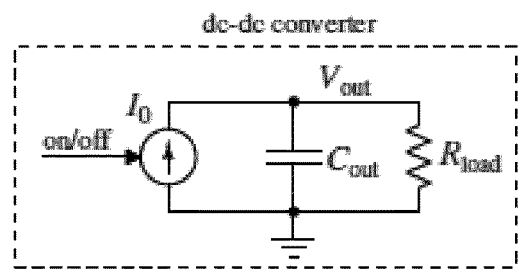
FIG. 19 shows (a) a schematic circuit diagram of a model of the new resonant power converter together with (b) a conventional hysteretic control circuit and (c) a phase-shift burst mode control circuit.
Figure 19:
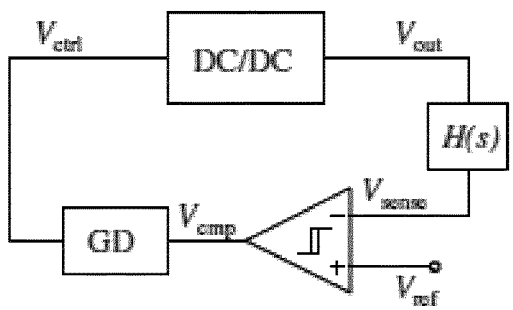
Figure 19:
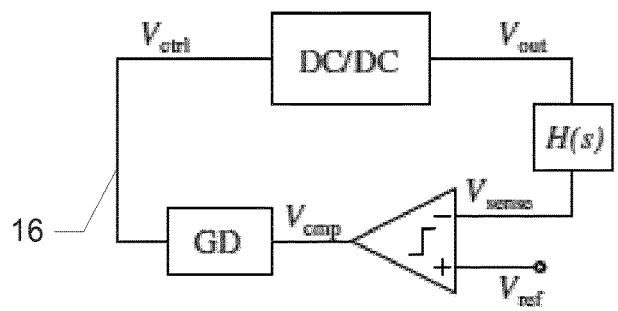

FIG. 19(b) shows the model of FIG. 19(a) controlled with a conventional hysteretic control circuit and FIG. 19(c) shows the model of FIG. 19(a) controlled with a phase-shift burst mode control circuit.

For both circuits, the VHF power converter is operating (turned-on) when $V_{ctrl}$ is high, e.g. 2 Volt, delivering an average current of $I_0$=2 A. The VHF power converter is turned-off when $V_{ctrl}$ is low, e.g. 0 Volt. In the present example, capacitor $C_{out}$ and load $R_{load}$ are set to 10 μF and 10Ω, respectively. Reference voltage $V_{ref}$ equals 1 V, high impedance signal conditioning network H(s) has ratio of $V_{sense}/V_{out}$=1:N, e.g. 1:10, independent of frequency. The circuit configurations and component values are selected so that the target output $V_{out}$ is equal to 10 V and at nominal load, the VHF power converter operates at a 50% duty cycle. It is assumed that gate drivers do not introduce any delay in any of the circuits of FIGS. 19(a)-(c) so that $V_{ctrl}$=$V_{cmp}$.

Figure 20:
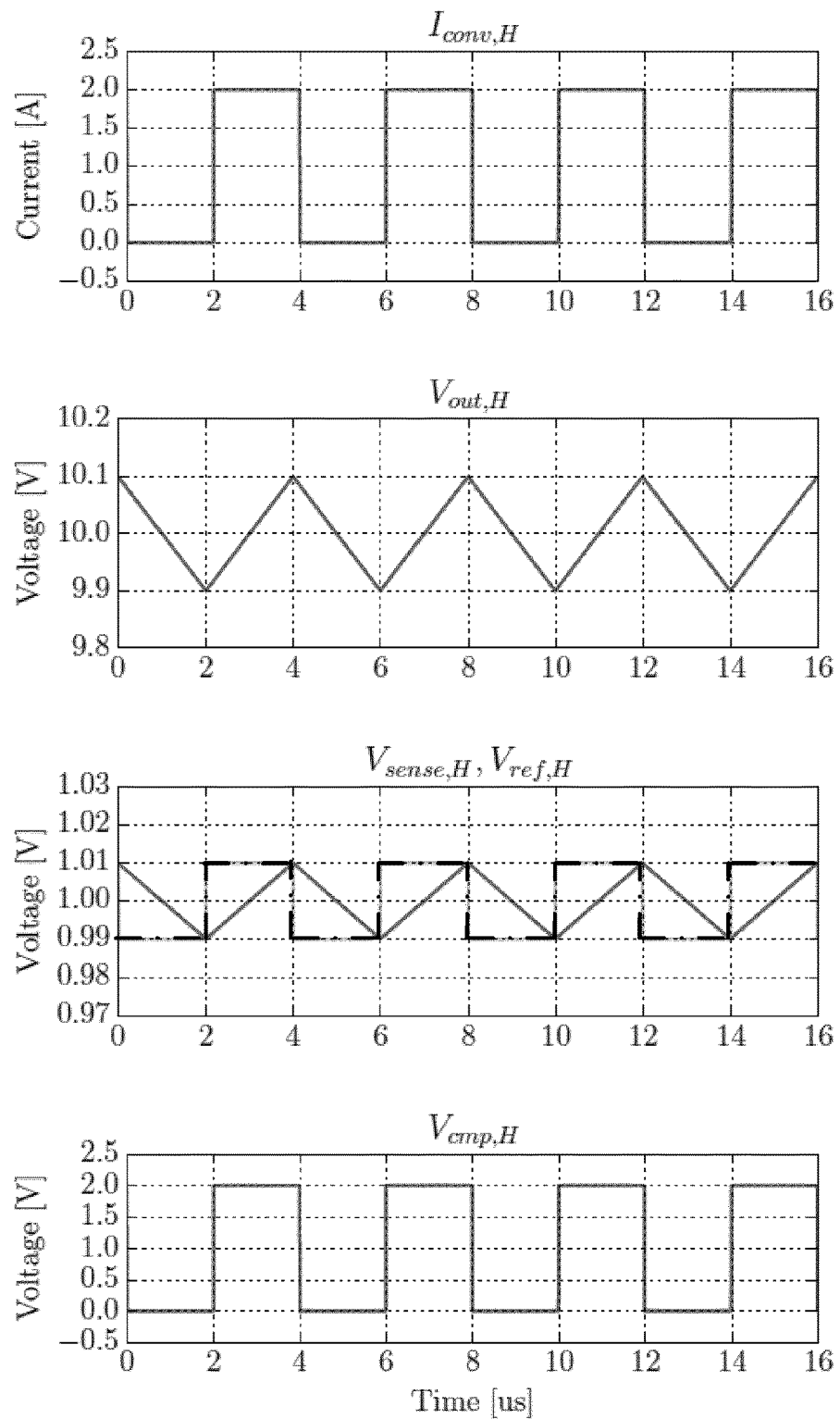
FIG. 20 shows a plot of simulated waveforms of the model converter current and voltages controlled by the hysteretic control circuit.

In the control circuit with hysteresis shown in FIG. 19(b), instantaneous response of the comparator is assumed so that the comparator does not add a delay in the control loop. In the present example, the hysteresis window is $V_H$=20 mV. The comparator turns the converter on when $V_{sense}<V_{ref}$ and turns it off otherwise. Simulated waveforms of the converter voltages of the converter with hysteresis control are shown in FIG. 20.

Modulation frequency $f_M$, i.e. the frequency at which the converter turns on and off, is given by:

$$f_M = \frac{I_0/2}{2\Delta V_{out} C_{out}} = \frac{I_0/2}{2N V_H C_{out}}$$

This equation is derived under the assumption that propagation delay $t_D$ of the comparator, the gate driver, and the power stage of the converter is zero, and the equation is a good approximation when $t_D \ll 1/f_M$. Expensive components, e.g. comparators, gate drivers, etc., have to be used in VHF designs to realize small propagation delays in the feedback loop.

Figure 21:
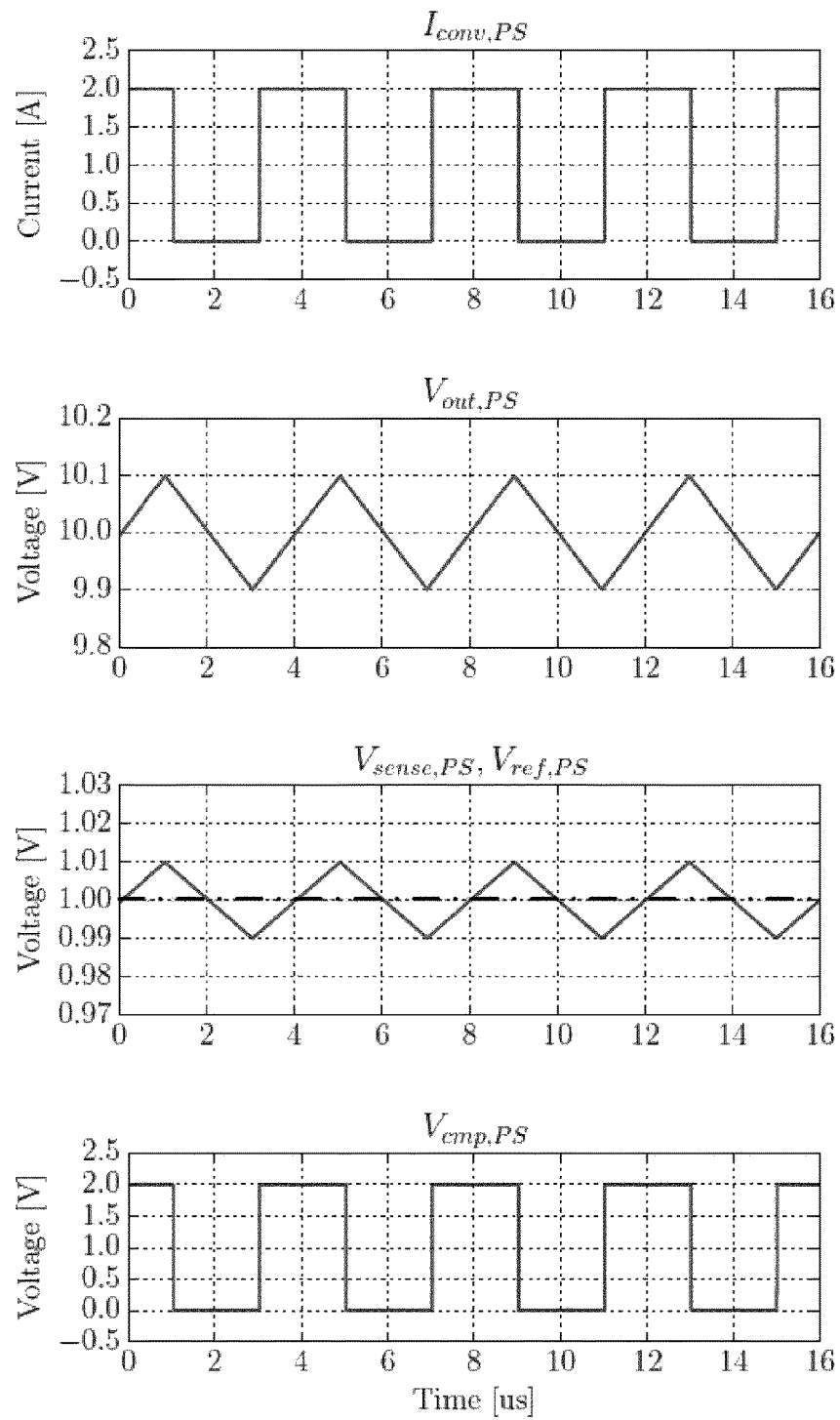
FIG. 21 shows a plot of simulated waveforms of the model converter current and voltages controlled by the phase-shift burst mode control circuit.

Time difference $\Delta T$ from $V_{sense}=V_{ref}$ until $V_{sense}=V_{ref}+V_H$ in FIG. 20 equals $1/(4 f_M)$. If $V_H$->0 and $t_D$->$1/(4 f_M)$, the waveforms shown in FIG. 20 turn into the waveforms shown in FIG. 21 showing simulated waveforms of the converter voltages of the converter with phase shift burst mode control. The waveforms in FIGS. 20 and 21 are aligned so that $V_{sense}$ voltages cross the respective $V_{ref}$ voltages at the same time, e.g. 2 µs, 4 µs, 6 µs, etc. The output voltage ripples are identical in FIGS. 20 and 21, however the signal propagation delay through the feedback loop is $1/(4 f_M)$, see the time difference between converter currents $I_{conv,H/PS}$, comparator output voltages $V_{cmp,H/PS}$, etc.

With the component values mentioned above, the modulation frequency is 250 kHz.

In FIG. 21, the power converter is turned-on at 3 µs, 7 µs, 11 µs, and 15 µs, and the power converter is turned-off at 1 µs, 5 µs, 9 µs, and 13 µs, and the first time period is equal to the second time period that is equal to 2 µs and the fourth time period, i.e. the turn-on delay $t_{D,on}$, is equal to the third time period, i.e. the turn-off delay $t_{D,off}$, that is equal to 1 µs.

The converter with phase shift burst mode control provides the same output voltage ripple (i.e. $\Delta V_{out,H}=\Delta V_{out,PS}$) as the converter with conventional hysteresis control, while using one or more components in the feedback loop with significantly larger respective delays. The resulting delay may be distributed arbitrarily between the power stage, the comparator, and the gate driver(s). This is very important for VHF converters, since numerous start-up and shutdown techniques (self-oscillating gate drivers and converters) with small, but finite delays may be utilized in a VHF converter with phase shift burst mode control.

Turn-on and turn-off delay ($t_{D,on}$ and $t_{D,off}$) do not need to be equal, either. Any one of the components in the feedback loop in any combination may contribute to the values of the turn-on and turn-off delays, with the restraint that:

$$t_{D,on} + t_{D,off} = \frac{1}{2f_M}$$

Output voltage of a converter with hysteresis control resides within the range from $H(s)^{-1}(V_{ref,H}-V_H)$ to $H(s)^{-1}(V_{ref,H}+V_H)$, resulting in a voltage ripple of $\Delta V_{out,H}$.

This is different of a converter with phase shift burst mode control as illustrate in FIG. 19(c) in which the output voltage $V_0$ is load dependent. The output voltage $V_0$ decreases with increased load. If output voltage ripple at $I_{out}$=1A is $\Delta V_{out,PS}$ and under assumptions of constant delay in the comparator (and otherwise ideal components), average value of $V_{out,PS}$ ranges from $\Delta V_{out,PS}/2$ at $I_{out}$=0 to $-\Delta V_{out,PS}$ at $I_{out}=I_0$ linearly with $I_{out}$.

The variation of the output voltage $V_o$ as a function of output current may be decreased in various ways. One way is to allow the reference voltage to change as a function of the output voltage $V_o$ to compensate for the change in the output voltage $V_o$.

Figure 22:
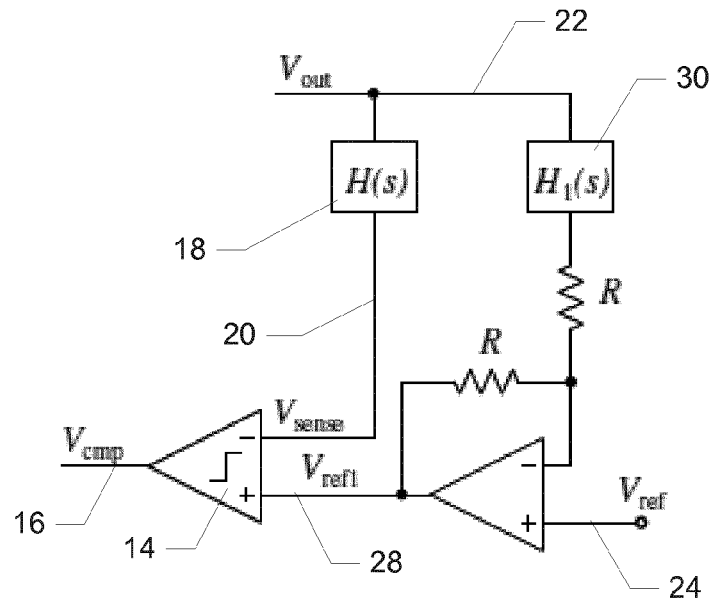
FIG. 22 shows schematic circuit diagrams of control circuits with varying sense voltage.
Figure 22:
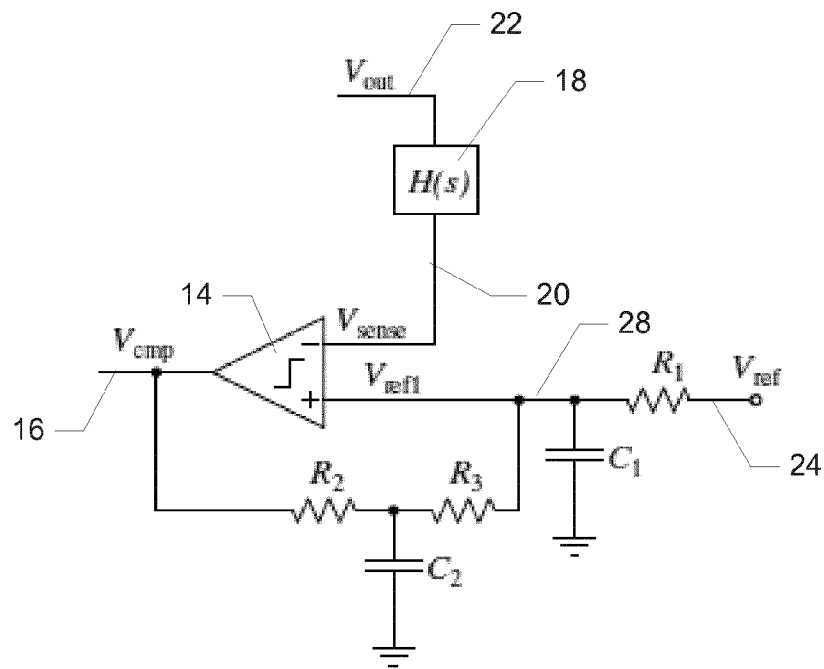

FIG. 22(a) shows a control circuit in which the sense voltage 20 is compared to a reference voltage 28 that is adjusted as a function of the mean output voltage $V_o$. $H_1(s)$ is an ordinary low-pass filter. In the illustrated circuit $V_{ref1}=V_{ref}-(V_{ref,mean}-V_{ref})$, where $V_{ref,mean}$ is the output of the low-pass filter $H_1(s)$. Thus, $V_{ref1}=V_{ref}$ when $V_{ref,mean}=V_{ref}$ and $V_{ref1}$ decreases when the mean output voltage $V_o$ increases and vice versa whereby the variation of the mean output voltage $V_o$ as a function of output current is counteracted.

FIG. 22(b) shows another control circuit in which the sense voltage 20 is compared to a reference voltage 28 that is adjusted as a function of the mean of the comparator output voltage $V_{cmp,PS}$ 16. The operation of the illustrated control circuit is based on the fact that the average value of $V_{cmp,PS}$ varies linearly with the output current $I_{out}$.

Reference voltage $V_{ref1}$ is formed by superposition of $V_{ref,PS}$ and low-pass filtered $V_{cmp,PS}$. The resistor and capacitor values in the compensation network need to be chosen to provide sufficient attenuation of the ac component of $V_{cmp,PS}$.

In the illustrated control circuit, when the converter operates at 50% modulation, the average of $V_{cmp,PS}$ equals $V_{ref}$. If the output current $I_{out}$ is reduced, the average value of $V_{cmp,PS}$ is reduced, thus decreasing reference voltage $V_{ref1}$ 28 thereby counteracting the increase of the output voltage $V_o$ that would otherwise result for the reduced output current $I_{out}$. If the output current $I_{out}$ is increased, the average value of $V_{cmp,PS}$ is increased, thus increasing reference voltage $V_{ref1}$ 28 thereby counteracting the decrease of the output voltage $V_o$ that would otherwise result from the increased output current $I_{out}$. $V_{ref1}$ is calculated with the following formulae:

$$V_{ref1} = V_{ref,PS} \frac{R_1 \| (R_2 + R_3)}{R_1} + V_{cmp,PS,high} \frac{I_{out}}{I_0} \frac{R_1 \| (R_2 + R_3)}{R_1}.$$

The invention claimed is:

1. A power converter comprising:
a control circuit configured to compare a sense voltage with a single reference voltage, and having a control output that is coupled to the power converter to control the power converter to turn-on and turn-off by enabling and disabling energy transfer from an input of the power converter to an output of the power converter in such a way that
after each previous turn-off of the power converter, the power converter is turned-on only when
an absolute value of the sense voltage is less than or equal to an absolute value of the single reference voltage, and
a first time period has elapsed since the previous turn-off of the power converter; and
after each previous turn-on of the power converter, the power converter is turned-off only when the absolute value of the sense voltage is larger than or equal to the absolute value of the single reference voltage, and a second time period has elapsed since the previous turn-on of the power converter.

2. The power converter according to claim 1, wherein the control circuit comprises a comparator that is configured to compare the sense voltage with the single reference voltage, and having a comparator output that is the control output.

3. The power converter according to claim 1, wherein the power converter is configured for operation at a frequency above 1 MHz.

4. The power converter according to claim 1, further comprising a delay circuit configured to provide at least part of at least one of the first and second time periods.

5. The power converter according to claim 1, wherein an output voltage of the power converter is coupled to a signal conditioning circuit configured to output the sense voltage.

6. The power converter according to claim 1, further comprising a switch, wherein the control output is configured to control the power converter to turn-on and turn-off by turning on and turning off the switch of the power converter.

7. The power converter according to claim 1, wherein the power converter is a SEPIC converter.

8. The power converter according to claim 7, wherein the SEPIC converter is a self-oscillating SEPIC converter.

9. The power converter according to claim 7, wherein the power converter is an interleaved SEPIC converter.

10. The power converter according to claim 1, wherein the control circuit is configured to compensate a dependence of the sense voltage on an output current.

11. The power converter according to claim 10, wherein the control circuit is configured to vary the single reference voltage in dependence on the output current, whereby the dependence of the sense voltage on the output current is compensated.

12. The power converter according to claim 10, wherein the control circuit is configured to vary at least one of the first and second time periods in dependence of the output current, whereby the dependence of the sense voltage on the output current is compensated.

13. The power converter according to claim 1, wherein the sense voltage is the only sense voltage received by the control circuit.

14. The power converter according to claim 1, wherein the single reference voltage is the only reference voltage received by the control circuit.

15. A method of controlling a power converter, comprising:

after each previous turn-off of the power converter, turning the power converter on by enabling energy transfer from an input of the power converter to an output of a power converter only when an absolute value of a sense voltage is less than or equal to an absolute value of a single reference voltage, and a first time period has elapsed since the previous turn-off of the power converter; and after each previous turn-on of the power converter, turning the power converter off by disabling energy transfer from an input of the power converter to an output of the power converter only when the absolute value of the sense voltage is larger than or equal to the absolute value of the single reference voltage, and a second time period has elapsed since the previous turn-on of the power converter.

16. The method according to claim 15, further comprising comparing the sense voltage with the single reference voltage by a control circuit, wherein the sense voltage is the only sense voltage received by the control circuit.

17. The method according to claim 15, further comprising comparing the sense voltage with the single reference voltage by a control circuit, wherein the single reference voltage is the only reference voltage received by the control circuit.

18. The method according to claim 15, wherein the power converter comprises a switch, wherein turning the power converter on comprises turning on the switch of the power converter, and wherein turning the power converter off comprises turning off the switch of the power converter.

19. The method according to claim 15, wherein the power converter comprises a switch, wherein turning the power converter on comprises turning off the switch of the power converter, and wherein turning the power converter off comprises turning on the switch of the power converter.

* * * * *